Dec. 1, 1953   H. V. ADCOCK   2,661,446
ELECTRICAL COIL
Filed June 13, 1951

INVENTOR.
Herbert V. Adcock
BY
Arnold J. Ericsen
Attorney

Patented Dec. 1, 1953

2,661,446

UNITED STATES PATENT OFFICE 2,661,446

ELECTRICAL COIL

Herbert V. Adcock, Zanesville, Ohio, assignor to McGraw Electric Company, Milwaukee, Wis., a corporation of Delaware Application June 13, 1951, Serial No. 231,397

1 Claim. (Cl. 317—222)

This invention relates to wound electrical coils, and is particularly directed to a novel means for anchoring starts and/or finishes of the coil lead wires.

There has long been a problem relative to anchoring the lead wires of wound electrical coils, especially where the coils are wound without the benefit of end flanges, bobbins, or some other similar retaining device. Anchoring methods that have been used in the past include string ties, fabric tapes, or adhesive tapes. The string and tape ties tend to loosen with time. Both of these grip the insulation rather than the wire, and neither hold well on plastic coated wire which has a relatively low coefficient of friction. Water activated adhesive tapes also will not stick to enamel or plastic coated wire, tear easily, and tend to loosen when the coils are dried. Pressure sensitive tapes are destroyed by impregnating oils. In addition, none of the older methods will satisfactorily resist a pull in the direction of the coil axis.

It is an object of this invention to provide a means of anchoring coil lead wires during starting or finishing of the coil.

It is a specific object of this invention to provide an anchoring means for coil winding lead wires utilizing a piece of sheet-like insulating material held in place by the winding layers themselves, and to further notch this material in a manner that will resist axial and radial stresses upon the secured lead wire.

Further objects will become apparent from the following description and drawing wherein.

Figure 1:
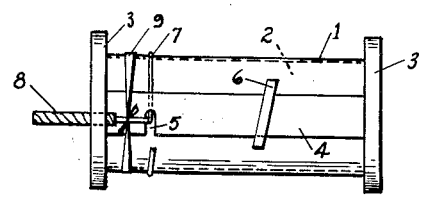
Fig. 1 is an elevational view of a coil form disclosing the novel means for anchoring a lead wire prior to winding.
Figure 2:
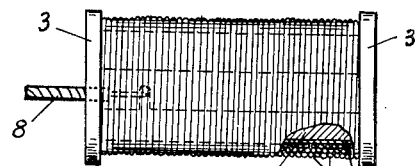
Fig. 2 is an elevational view of a partially wound coil with a portion broken away to reveal the interior winding and insulation layers.

The novel means for anchoring or securing lead wires during starts and/or finishes of coil winding will be more clearly described with reference to Fig. 1 of the drawing. It will be obvious from the following description that a finished coil may be wound directly on the core legs (not shown) of a transformer or other induction apparatus under the method taught in the U. S. Letters Patent No. 2,305,999 granted to Alwin G. Steinmayer and William E. Krueger on December 22, 1942, and assigned to the same assignee as the present invention. This patent discloses a method of winding coils directly on the transformer core legs, wherein driven winding flanges are used to keep the coil intact and also to supply rotational power to the coil during winding operations. These flanges are removed after the coil is wound and the leads are anchored in place. The transformer core leg acts as its own mandrel (not shown).

The various figures of the drawing disclose typical steps in winding a coil without benefit of a preformed bobbin, but similar in nature to the coil disclosed in the above mentioned patent. That is, a split insulating sleeve 1 is fitted to the winding mandrel, or core leg 2. This sleeve acts as an insulating means and also as a bearing during winding operations. As taught in the above patent, split end flanges are clamped at the outer end of the sleeve 1, and may be rotated either frictionally, or by a gear-toothed driving arrangement.

After the insulating sleeve 1 and the driven end flanges 3 are secured, the unit is ready for winding. The novel lead wire anchoring means is next positioned on the insulating sleeve. This consists of a preformed strip of pressboard, fibre or similar insulating material 4. The anchor strip or pad 4 is provided with a notched portion 5. The dimensions of this notch are dependent upon the dimensions of the lead wire to be anchored. In fact, it is within the scope of this invention to merely slit the pad 4 with a scissors for smaller diameter wires. Where mass production of coils with substantially identical electrical requirements is desired, the novel anchor pads may be pre-notched at an assembly station prior to the winding operation. However, the invented anchor strip 4 is readily adaptable to substantially all coil dimensions. It will be apparent that the production operator may be provided with a hand punch tool (not shown) formed to punch the desired dimensional notch 5. The position of the notch on the anchor pad 4 is dependent upon the manufacturing specifications relative to number of wire turns, wire size, insulation, etc.

During starting operations it is often beneficial to temporarily hold the anchor pad in place with a strip of adhesive tape 6 until it is secured by the first layer of wire turns. Since this is only a temporary measure, it is no matter that the adhesive may later dissolve and fail to hold when the coil has been impregnated.

In the practice of the invention, the coil wire 7 from a suitable source is brought beneath the novel anchor pad 4 and threaded through the pre-positioned notch 5 as clearly shown in Fig. 1. The wire may be bent substantially 90° as shown, with the lead end being insulated with a relatively short length of tubing 8 under well-known practices. It will be apparent that the coil wire 7 may be spliced to heavier insulated lead wire (not shown) and still be securely anchored by the novel anchoring means.

Following common practice, a strip of cloth insulating tape 9 may be used to center-hitch the lead. This assures definite positioning of the lead for connection with an electrical terminal block or the like (not shown). The lead is next preferably threaded through an opening in the end flange 3, and temporarily held against the outer surface of the flange in order to clear any obstructions during winding.

Figure 3:
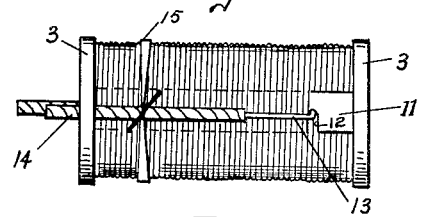
Fig. 3 is an elevational view of the coil completely wound with layers of inductive windings disclosing the novel means of anchoring the finish lead.

Coil winding now proceeds in the usual, well-known manner. The coil layers, denoted here by reference character 10, are wound upon the anchor strip or pad 4, thereby conveniently holding it in place. Winding of the coil wire is continued layer upon layer until the layer preceding the final predetermined layer has been wound. A novel anchor strip or pad 11, substantially identical to the anchor strip 4, is placed over the windings. Winding is again resumed with the convolutions of the final layer preferably covering the insulating anchor strip 11 as a means of securing the same. It is not unusual to end the specified number of convolutions less than the full core length. The anchor strip 11 may be hand punched to provide the notched portion 12 adjacent the last wound convolution. As clearly shown in Fig. 3, the finish lead portion 13 of the coil wire 7 is threaded under the anchor strip and brought out through the notch 12. The lead may be bent as shown to axially cross the coil, protruding from the same side as the starting lead.

As stated above, the lead may be spliced to a heavier lead wire (not shown) and covered with an insulating tube 14, if so desired. Also, a strip of cloth tape 15 may be used to center-hitch the lead. It is often the practice to provide cloth or other insulating wrappings 16 to further insulate and protect the windings. These wrappings aid in securing the lead, but it is within the province of this invention to omit them where the windings are otherwise insulated.

It will be apparent that under manufacturing practices involving large quantity production of coils of the same specification, the novel anchor strips 4 and 11 may be pre-notched, inasmuch as the convolutions will start and finish at substantially the same relative positions on each coil.

Also, it may be convenient from a manufacturing standpoint to provide a plurality of adjacent pre-notched portions 5 and 12 (not shown), with the coil winding operator anchoring the lead wire in the most convenient portion. In addition, though the term "strip" has been used throughout the specification, it will be obvious that any convenient length or width pad may be provided as long as there is a free edge from which an anchoring notched portion 5 or 12 may be positioned.

Figure 4:
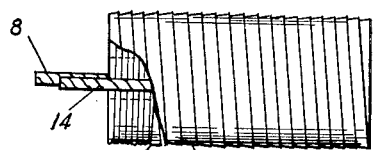
Fig. 4 is an elevational view of a finished coil wrapped with cloth insulating tape, and having its temporary end flange members removed, a portion of the insulating wrapping shown broken away to reveal the novelly anchored lead wires.

After the winding and wrapping operations have been completed, the end flanges 3 may be removed to provide a finished self-contained coil as shown in Fig. 4. However, it will be apparent that the above described method of anchoring lead wires may be used on any electrical coil whether wound on a bobbin, wound on a mandrel with or without flanges, or directly upon a transformer core if so desired under methods taught in the above referred to Letters Patent. Naturally, it will be obvious that this method of anchoring is most expeditious when used with the larger diameter electrical winding wires but the method also may be used with equivalent results on smaller diameter winding wires.

It will be apparent that a novel means for anchoring starts and/or finishes in electrical coil winding has been provided, utilizing a novel and simply constructed anchor pad for securing the wire leads during and after winding operations.

I claim:

An insulated wire coil having a plurality of layers of turns wound about a central core, the ends of said coil comprising respectively an inner lead wire portion extending axially of said coil from the innermost layer of turns and an outer lead wire portion extending axially from the outermost layer of turns, an inner anchoring strip for said inner lead wire comprising an axially-extending strip of semi-rigid insulating material having a wire-receiving notch in one axially-extending edge thereof substantially at right angles to said edge, said strip lying between said core and said innermost layer of turns, said inner lead wire portion extending from beyond the end of the coil axially over said strip to said notch and continuing as the first coil turn under said strip from said notch, the subsequent coil turns of the innermost layer passing over said strip to firmly anchor the strip and the inner lead portion, and an outer anchoring strip for said outer lead wire comprising an axially-extending strip of semi-rigid insulating material having a wire-receiving notch in one axially-extending edge thereof substantially at right angles to said edge, a portion of said strip lying directly beneath the outermost layer of turns, the last outer turn of said coil extending beneath said strip through said notch and continuing substantially axially as said outer lead wire.

HERBERT V. ADCOCK.

References Cited in the file of this patent
UNITED STATES PATENTS

| Number | Name | Date |
|---|---|---|
| 1,723,261 | Varley | Aug. 6, 1929 |
| 2,122,894 | Sager | July 5, 1938 |
| 2,154,070 | Franz | Apr. 11, 1939 |